United States Patent
Martin et al.

(10) Patent No.: US 9,916,097 B1
(45) Date of Patent: Mar. 13, 2018

(54) AUOTMATED STORAGE TIERING BASED ON STORAGE POOL STATE AND SERVICE LEVEL OBJECTIVES

(71) Applicant: EMC Corporation, Hopkinton, MA (US)

(72) Inventors: Owen Martin, Hopedale, MA (US); Malak Alshawabkeh, Franklin, MA (US); Vladimir Desyatov, Hollis, NH (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 164 days.

(21) Appl. No.: 14/752,018

(22) Filed: Jun. 26, 2015

(51) Int. Cl.
*G06F 3/06* (2006.01)

(52) U.S. Cl.
CPC ............ *G06F 3/061* (2013.01); *G06F 3/0634* (2013.01); *G06F 3/0653* (2013.01); *G06F 3/0689* (2013.01)

(58) Field of Classification Search
CPC ...... G06F 3/061; G06F 3/0634; G06F 3/0653; G06F 3/0689; G06F 11/3034
See application file for complete search history.

(56) References Cited

U.S. PATENT DOCUMENTS

| | | | |
|---|---|---|---|
| 8,543,923 B2* | 9/2013 | Fisher | G06F 3/0481 715/736 |
| 2007/0118710 A1* | 5/2007 | Yamakawa | G06F 3/061 711/165 |
| 2011/0010514 A1* | 1/2011 | Benhase | G06F 3/061 711/162 |
| 2011/0010518 A1* | 1/2011 | Kavuri | G06F 3/0647 711/165 |
| 2013/0312005 A1* | 11/2013 | Chiu | G06F 3/061 718/105 |
| 2014/0189196 A1* | 7/2014 | Kelkar | G06F 12/16 711/102 |
| 2015/0277762 A1* | 10/2015 | Guo | G06F 3/061 711/154 |

* cited by examiner

*Primary Examiner* — Edward J Dudek, Jr.
(74) *Attorney, Agent, or Firm* — Anderson Gorecki LLP (57) ABSTRACT

Promotion and demotion of extents for each storage pool is determined based on a storage pool state defined by demanded activity and demanded capacity. Promotion and demotion of extents for each storage group is determined based on whether the storage group is performing at SLO, above SLO or below SLO. Events are identified and stored in local records using hash tables. The locally stored events are used to update a database of historical extent activity. A moving average of extent activity is used to calculate the demanded activity.

20 Claims, 7 Drawing Sheets

AUOTMATED STORAGE TIERING BASED ON STORAGE POOL STATE AND SERVICE LEVEL OBJECTIVES

CROSS-REFERENCE TO RELATED APPLICATIONS

NA

BACKGROUND

Aspects of this disclosure are generally related to data storage systems. Data storage systems are used to maintain relatively large data sets and support a relatively large number of concurrent users. The basic building blocks of a data storage system may include storage arrays or storage server clusters. Examples of storage arrays, which will be used herein for the purposes of explanation, include the Symmetrix and VMAX family of storage array products of EMC Corporation. Each storage array typically includes multiple physical storage devices which are used to present logical storage devices to applications running on host devices. Different types of physical storage devices may be used, and those storage devices may be organized in hierarchical tiers based on technology type, where different technology types are associated with different levels of performance. Typically, the hierarchical tier on which an extent of data is stored is selected as a function of predicted activity of that extent. For example, recent access activity may be used as a predictor of future access activity. Logical storage devices created for an application may be organized in a storage group. The storage group may be associated with SLOs (service level objectives) which indicate demands for quality of service in terms of IO response time.

SUMMARY

All examples, aspects and features mentioned in this document can be combined in any technically possible way.

In accordance with an aspect, an apparatus comprises: a data storage system comprising: a plurality of non-transitory data storage devices each having a performance capability, where ones of the storage devices having a common performance capability are grouped together in a storage pool at a storage tier and the data storage system includes multiple storage tiers; at least one storage director which presents logical storage devices to an application, the logical storage devices being backed by the non-transitory storage devices; and a data movement engine configured, for each storage pool, to: assign one state of a plurality of states to the storage pool based on demanded activity and demanded capacity, the plurality of states including a healthy state in which demanded activity and demanded capacity are acceptable for the storage pool, a first degraded state in which demanded activity is unacceptable for the storage pool, and a second degraded state in which demanded capacity is unacceptable for the storage pool; where the storage pool is in the first degraded state, promote extents from that storage pool to a different storage pool of a tier with greater performance capability in order to cause that storage pool in the first degraded state to be in the healthy state; and where the storage pool is in the second degraded state, demote extents from that storage pool to a storage pool of a tier with lesser performance capability in order to cause that storage pool in the second degraded state to be in the healthy state. In some implementations ones of the logical storage devices are grouped together in a storage group, each storage group being associated with a service level objective, and the data storage system includes multiple storage groups, and the data movement engine is further configured to classify each of the storage groups as performing at their respective service level objective, below their respective service level objective or above their respective service level objective. In some implementations the data movement engine is further configured to promote extents from storage groups classified as performing below their respective service level objective. In some implementations the data movement engine is further configured to demote extents from storage groups classified as performing above their respective service level objective. In some implementations the apparatus comprises a plurality of storage directors, each having a local event record of events identified by that storage director. In some implementations each local event record comprises at least one hash table with at least one event counter associated with each active extent. In some implementations the apparatus further comprises a global event record in which the counters of the local event records are summed for each active extent. In some implementations the apparatus further comprises a database of historical activity of extents, the database being updated based on the global event record. In some implementations the data movement engine calculates at least one moving average of historical activity for each extent based on the database. In some implementations the at least one moving average is used to determine the demanded activity.

In accordance with an aspect a method comprises: in a data storage system comprising a plurality of non-transitory data storage devices each having a performance capability, where ones of the storage devices having a common performance capability are grouped together in a storage pool at a storage tier and the data storage system includes multiple storage tiers, and at least one storage director which presents logical storage devices to an application, the logical storage devices being backed by the non-transitory storage devices: for each storage pool: assigning one state of a plurality of states to the storage pool based on demanded activity and demanded capacity, the plurality of states including a healthy state in which demanded activity and demanded capacity are acceptable for the storage pool, a first degraded state in which demanded activity is unacceptable for the storage pool, and a second degraded state in which demanded capacity is unacceptable for the storage pool; where the storage pool is in the first degraded state, promoting extents from that storage pool to a different storage pool of a tier with greater performance capability in order to cause that storage pool in the first degraded state to be in the healthy state; and where the storage pool is in the second degraded state, demoting extents from that storage pool to a storage pool of a tier with lesser performance capability in order to cause that storage pool in the second degraded state to be in the healthy state. In some implementations ones of the logical storage devices are grouped together in a storage group, each storage group being associated with a service level objective, and the data storage system includes multiple storage groups, the method further comprising classifying each of the storage groups as performing at their respective service level objective, below their respective service level objective or above their respective service level objective. In some implementations the method further comprises promoting extents from storage groups classified as performing below their respective service level objective. In some implementations the method further comprises demoting extents from storage groups classified as performing above their respective service level objective. In some implementations the method further comprises maintaining a local event record associated with each storage director, each local event record comprising a record of events identified by that storage director. In some implementations the method further comprises maintaining each local event record as at least one hash table with at least one event counter associated with each active extent. In some implementations the method further comprises maintaining a global event record in which the counters of the local event records are summed for each active extent. In some implementations the method further comprises maintaining a database of historical activity of extents, the database being updated based on the global event record. In some implementations the method further comprises calculating at least one moving average of historical activity for each extent based on the database. In some implementations the method further comprises determining the demanded activity based on the at least one moving average.

DETAILED DESCRIPTION

Figure 1:
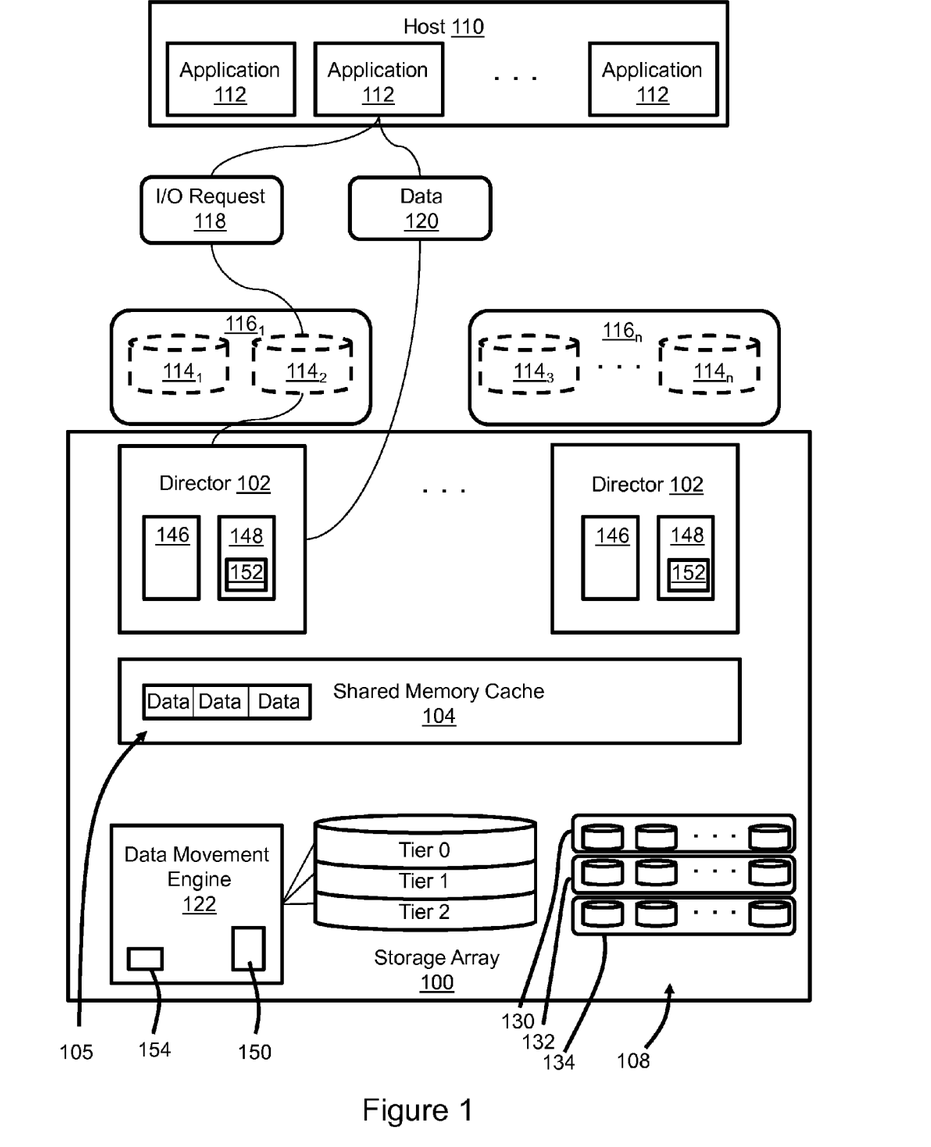
FIG. 1 illustrates a storage system including a storage array and a host device.

FIG. 1 illustrates a storage system which includes a storage array 100. Those skilled in the art will appreciate that the storage system could include a cluster of storage servers or other devices and architectures. The storage array 100 maintains data and supports IOs associated with a large number of concurrent users. Subsystems of the storage array 100 include storage directors 102, a shared memory cache 104, a data movement engine 122, and non-transitory physical data storage devices 108.

Each storage director 102 includes at least one multi-core CPU 146 and local volatile memory 148. The storage directors have access to the shared memory cache 104 and the storage devices 108. The directors also have interfaces for communicating with the host 110.

The shared memory cache 104 is illustrated as a single logical memory resource. However, the shared memory cache could be implemented in multiple non-transitory physical memory devices. For example and without limitation, the shared memory cache could be implemented as multiple volatile memory components such as RAM (random access memory) chips. The memory components may be distributed across multiple physical subsystems, e.g., on separate printed circuit boards associated with different ones of the storage directors 102. However, other types of memory components could be used and the chips are not necessarily distributed on multiple subsystems.

The non-transitory physical storage devices 108 are organized into hierarchical tiers. In the simplified example of FIG. 1 the storage devices are organized as tier 0, tier 1 and tier 2. Different technology types of physical storage devices have different performance characteristics and different costs per unit of storage capacity. Each tier may be associated with a particular technology type of physical storage device. For example and without limitation, the physical storage devices 108 may include a storage pool 130 of flash drive (e.g., EFDs (enterprise flash drive)) at tier 0, a storage pool 132 of FC (Fibre Channel) drives at tier 1, and a storage pool 134 of SATA (serial advanced technology attachment) drives at tier 2. There may be greater storage capacity at tier 2 than at tier 1, and greater storage capacity at tier 1 than at tier 0. However, a wide variety of implementations are possible in terms of the number of pools, tiers, types of storage devices used at the tiers, and storage capacity at each tier.

Computing devices such as user terminals and servers use the data maintained in the storage array 100 by communicating with a host device 110. The host device may be a type of server which hosts one or more instances of an application 112, e.g., a database, for example and without limitation. The storage array 100 may create logical storage devices $114_{1-n}$, for the application 112, although a system admin might create the logical storage devices for any of a variety of purposes. The storage directors 102, which include processor components which run programs, present the logical storage devices to the host device 110. The logical storage devices, which may be referred to as or by LUNs (logical unit numbers), may be represented as a set of contiguous address locations in a thinly provisioned virtual volume. The storage capacity allocation associated with the logical devices can change over time, e.g., increasing in response to Writes by the application. The application and the host device will typically be unaware of the actual location of data on the physical storage devices 108. An IO request 118 sent by an instance of the application 112 running on the host device 110 to the storage array 100 in order to Read or Write data will reference a location in a particular logical storage device, e.g., logical storage device $114_2$. The storage array maintains a mapping between the logical storage devices and the physical storage devices. The data stored on each logical storage device may be distributed across multiple tiers of the storage devices 108, and extents of data may be moved between tiers.

Multiple logical storage devices may be organized into a storage group (sometimes abbreviated as SG). The illustrated example includes SG $116_1$ through SG $116_n$. Each logical storage device can belong to up to one storage group. Each storage group may be associated with SLOs (service level objectives) which indicate one or more performance parameters which are demanded or requested by the storage group. For example, a SLO may indicate one or more performance parameters which enable the associated application to provide a target level of performance or user experience. Failing to satisfy the SLO does not necessarily cause the application to become non-functional, but user experience may fall below expectations. For context and without limitation, IO response time is a possible example of an SLO performance parameter.

A section 105 of the shared memory cache 104 is used to temporarily store selected data. For example, data may be copied to the shared memory 104 from the storage devices 108 in response to a hint or an IO request 118 by the host device 110. This can enhance system performance because when data 120 corresponding to an IO Read request is in the shared memory 104, i.e., a "cache hit," then that cached copy of the data can be used to quickly service the IO request. When the requested data 120 is not in the shared memory, i.e. a "cache miss," then that data must be copied by a director 102 from the storage devices 108 into the shared memory 104 in order to service the IO request. Data associated with an IO Write request is initially written to shared memory 104 and subsequently flushed from shared memory and written to the storage devices 108. Generally, any data that has not been accessed recently or within a predetermined period of time may be flushed from shared memory 104 and written to the storage devices 108. The storage directors may operate in parallel such that IO requests are concurrently serviced and the failure of one director does not cause the failure of other directors.

Figure 2:
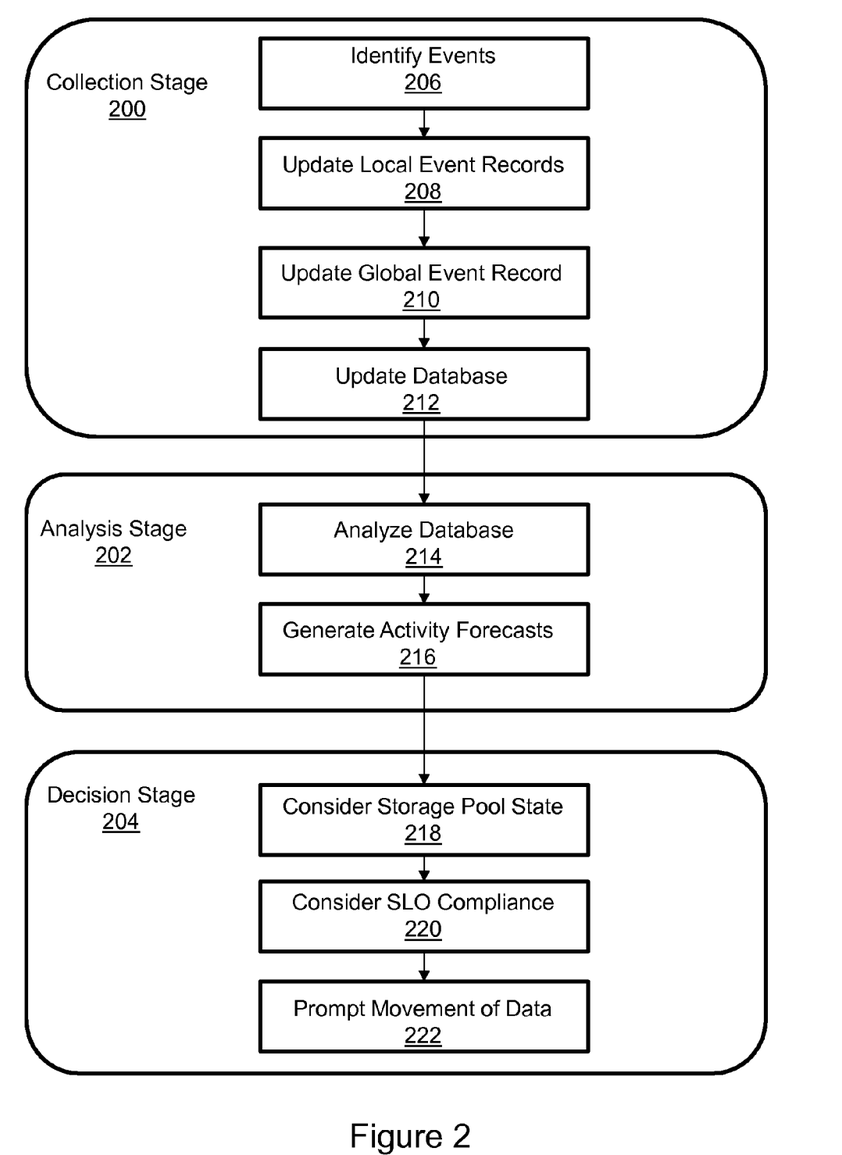
FIG. 2 illustrates a three stage technique for making storage tiering decisions.

Referring to FIGS. 1 and 2, the data movement engine 122 selects the tier of storage on which each extent of data is stored and prompts movement of extents of data between tiers of storage based on various calculations. The data movement engine may include program code stored in non-transitory memory that is used by one or more physical hardware processors to perform calculations and prompt movement of data between tiers in three stages: a collection stage 200, an analysis stage 202 and a decision stage 204.

Figure 3:
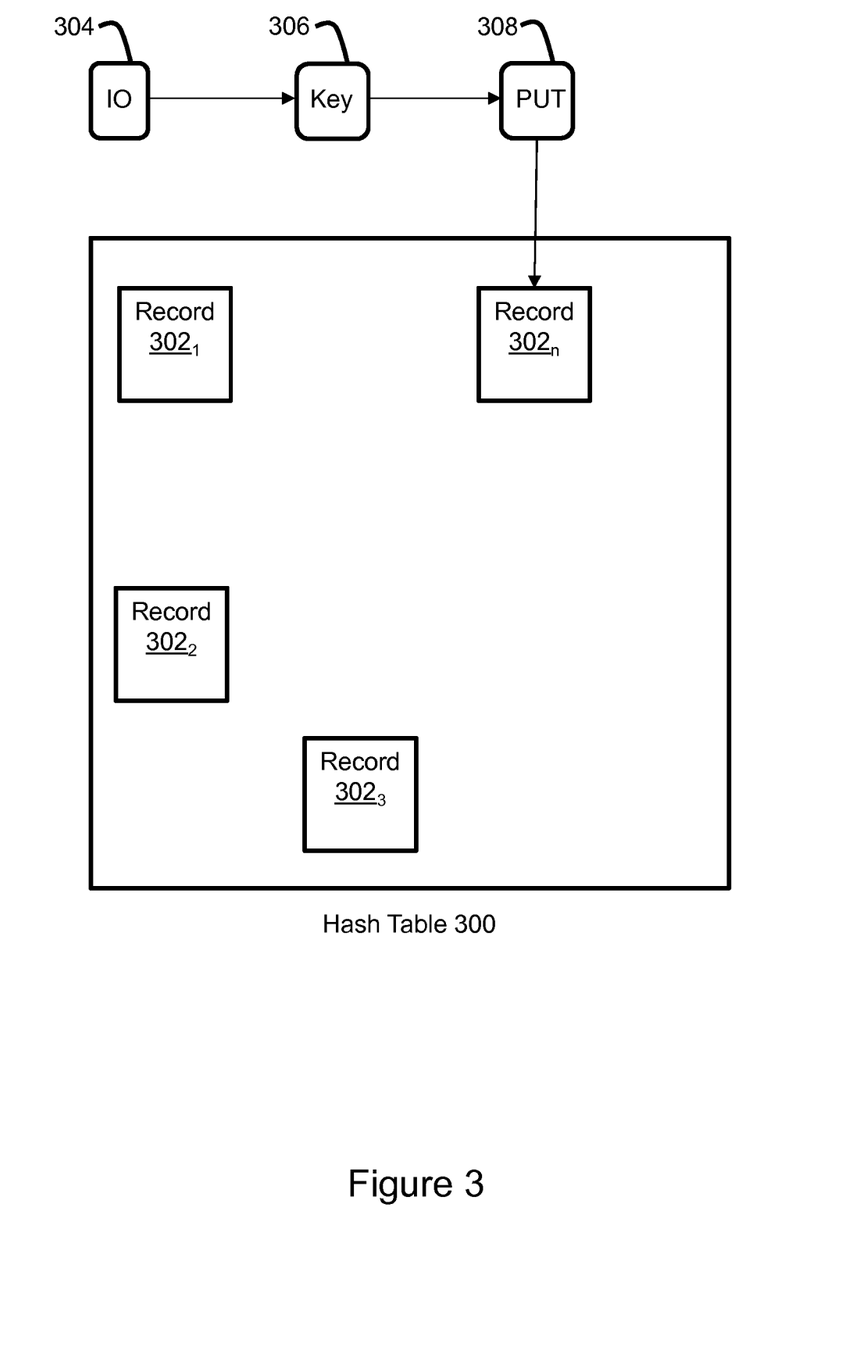
FIG. 3 illustrates aspects of the collection stage in greater detail.

Referring now to FIGS. 1 through 3, the collection stage 200 includes the operation of identifying events 206 in order to perform an event database update operation 212. Events include IOs such as Reads and Writes from the host 110. Maintaining the event database 150 is complicated by the large number of events per unit time that may occur in the storage array 100 in comparison with the limitations of known databases. Each director 102 identifies events which are associated with that director. Consequently, two Reads of the same extent that are handled by different directors are identified as separate single Read events by each director. Each director 102 utilizes its local memory 148 to maintain a local event record 152 which is updated in response to events identified by that director in operation 208. More particularly, the local event records indicate IO counts associated with different extents of data.

In at least one implementation each local event record 152 includes at least one hash table 300. Each hash table includes extent records $302_1$ through $302_n$ for each active extent. Each extent record contains counts of the number of Reads and the number of Writes for the corresponding active extent of data. In response to an IO event 304 associated with an extent, the logical device ID, extent and storage pool ID are used to generate a hash key 306. The hash key is used as an index into the hash table 300 to locate the extent record $302_n$. A counter in that extent record is updated using a PUT operation 308, e.g., incrementing the Read or Write counter. The local event records maintained by the directors are used to update a global event record 154 which may be maintained in volatile memory associated with the data movement engine 122. More particularly, the values of counters for extents in the local event records 152 are summed in the global event record 154 in an update operation 210, e.g., adding up the numbers of Reads to each director for a particular extent. The local memory space associated with local event records that have been added to the global event record is freed for other use, e.g., new local event records. Consequently, at a given point in time the local memory of a director need only store records for active extents that have not yet been added to the global event record 154.

Figure 4:
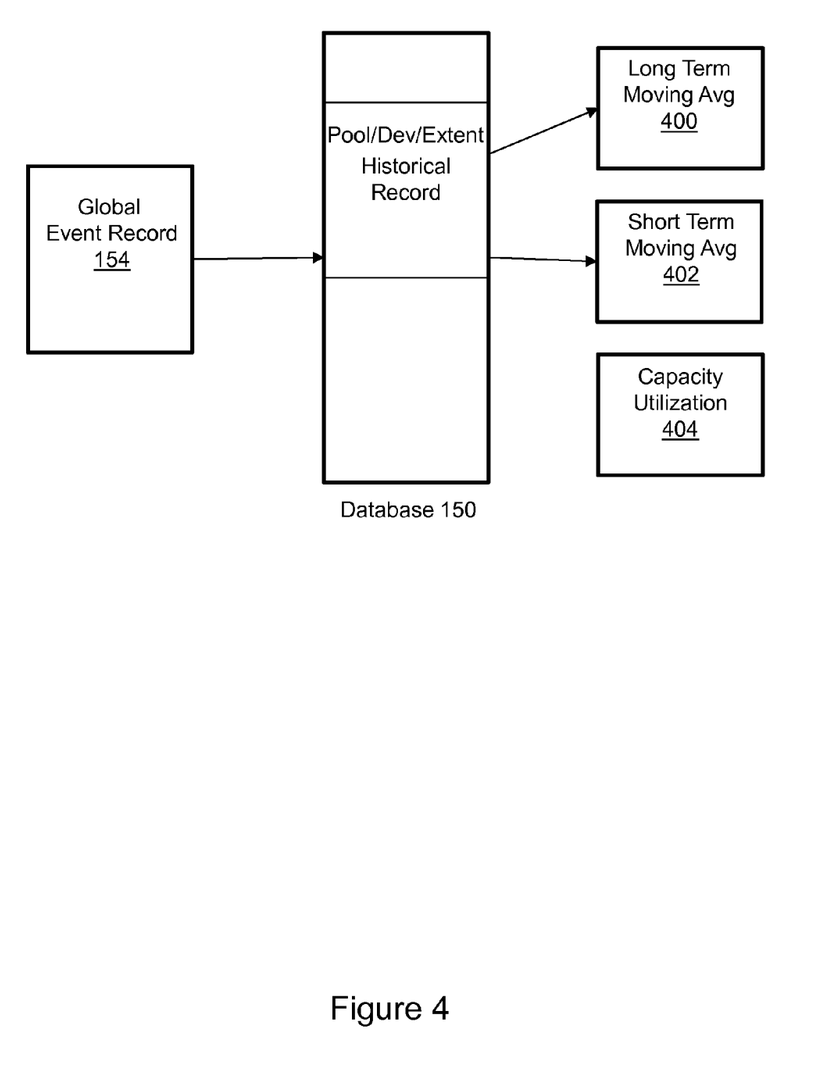
FIG. 4 illustrates aspects of the analysis stage in greater detail.

Referring now to FIGS. 1, 2 and 4, extent records of the global event record 154 are aggregated with earlier records in an event database update operation 212. The event database 150 is used to maintain a historical record for extents. An update of the database may include creating a new entry in the database associated with the period of time when events associated with the extent were identified. Thus, the database includes a historical record of extent activity.

In the analysis stage 202 the database 150 is analyzed in a database analysis operation 214. The results of the analysis are used to generate activity forecasts for active extents in an activity forecast generation operation 216. The extent activity forecasts may include at least one moving average of recent event activity, e.g., based on multiple entries in the historical record of the database. The illustrated example includes a 24 hour short-term moving average 400 and a 5 day long-term moving average 402. The moving averages may be exponential moving averages calculated as:

$$F_{t+1} = \alpha y_t + (1-\alpha) F_t \qquad \text{Eq. 1}$$

where $F_{t+1}$ is the forecast for the next period, $\alpha$ is a smoothing constant, $y_t$ is the observed value of the series in period t, and $F_t$ is the previous forecast for period t. The value of the smoothing constant is between 0 and 1. The greater the value of the smoothing constant, the more rapid the response to change. The data movement engine also maintains a record 404 of capacity utilization of the pools of storage devices 108.

Figure 5:
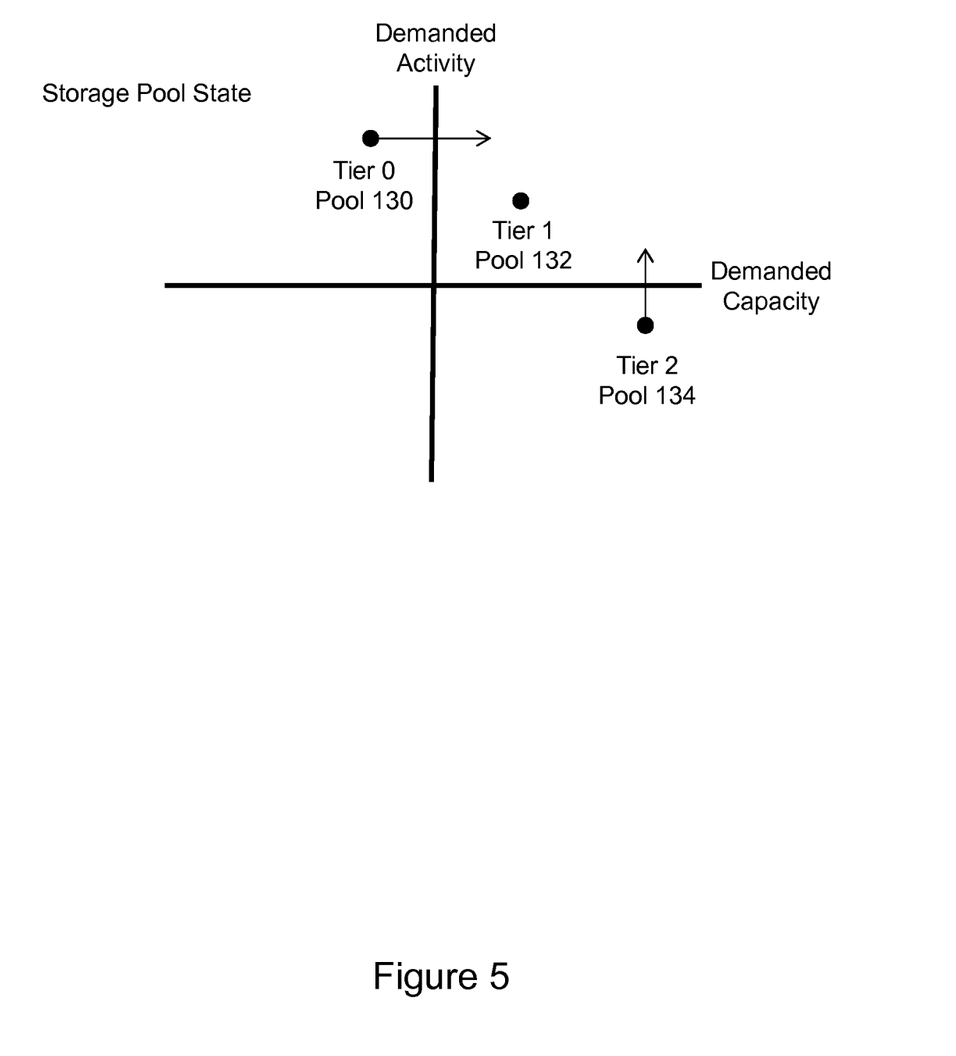
FIG. 5 illustrates consideration of storage pool state.

Referring now to FIGS. 1, 2 and 5, a first operation 218 of the decision stage 204 is to consider the state of the storage pools 130, 132, 134. The current state of each individual storage pool can be represented as a point in a Cartesian plane in which the X-axis represents demanded capacity, the Y-axis represents demanded activity (e.g., in IOs per second, aka IOPS), and the origin represents a threshold between acceptable levels of both demanded activity and demanded capacity. For example, a positive activity demand state may be indicative of IOPS demand being within the capabilities of the storage pool, and a positive demanded capacity may be indicative of demanded capacity being less than a practical maximum which is less than 100% of total capacity. The goal is for each storage pool to be in a healthy state defined by the first quadrant where both demanded activity and demanded capacity are at acceptable levels. If storage pool is in a healthy state defined by the first quadrant then extents are not promoted or demoted from that storage pool for the purpose of improving the performance of that storage pool. However, extents may be promoted or demoted to that storage pool in order to improve the performance of other storage pools which are not in the state defined by the first quadrant. For example, if the tier 0 storage pool 130 is in a degraded state defined by the second quadrant, i.e., it has greater than the selected threshold of acceptable capacity utilization, then extents may be demoted from the tier 0 storage pool to the tier 1 storage pool until the tier 0 storage pool is in the state defined by the first quadrant. This will tend to change the position of the tier 1 storage pool relative to the axes, but not necessarily by a vector of equal magnitude because the tier 1 storage pool may have more capacity than the tier 0 storage pool, including available capacity. In other words, the tier 1 storage pool may be able to accept extents from the tier 0 storage pool without being forced out of the healthy state defined by the first quadrant. Similarly, if the tier 2 storage pool is in the degraded state defined by the fourth quadrant, i.e., it has greater than the acceptable level of demanded activity, then extents may be promoted from the tier 2 storage pool to the tier 1 storage pool until the tier 2 storage pool is in the healthy state defined by the first quadrant. This will tend to change the position of the tier 1 storage pool, but not necessarily by a vector of equal magnitude because the tier 1 storage pool may be capable of servicing more IOPS than the tier 2 storage pool, including available IOPS bandwidth. The healthy state defined by the first quadrant includes a range of demanded activity and a range of demanded capacity. Promotion and demotion based on state tends to prompt fewer promotions and demotions than known systems which prompt marginal performance improvements as indicated by activity levels. In other words, excessive or unnecessary promotions and demotions may be mitigated. Reducing the number of promotions and demotions may help to keep the movement of data current relative to the activity forecasts.

Figure 6:
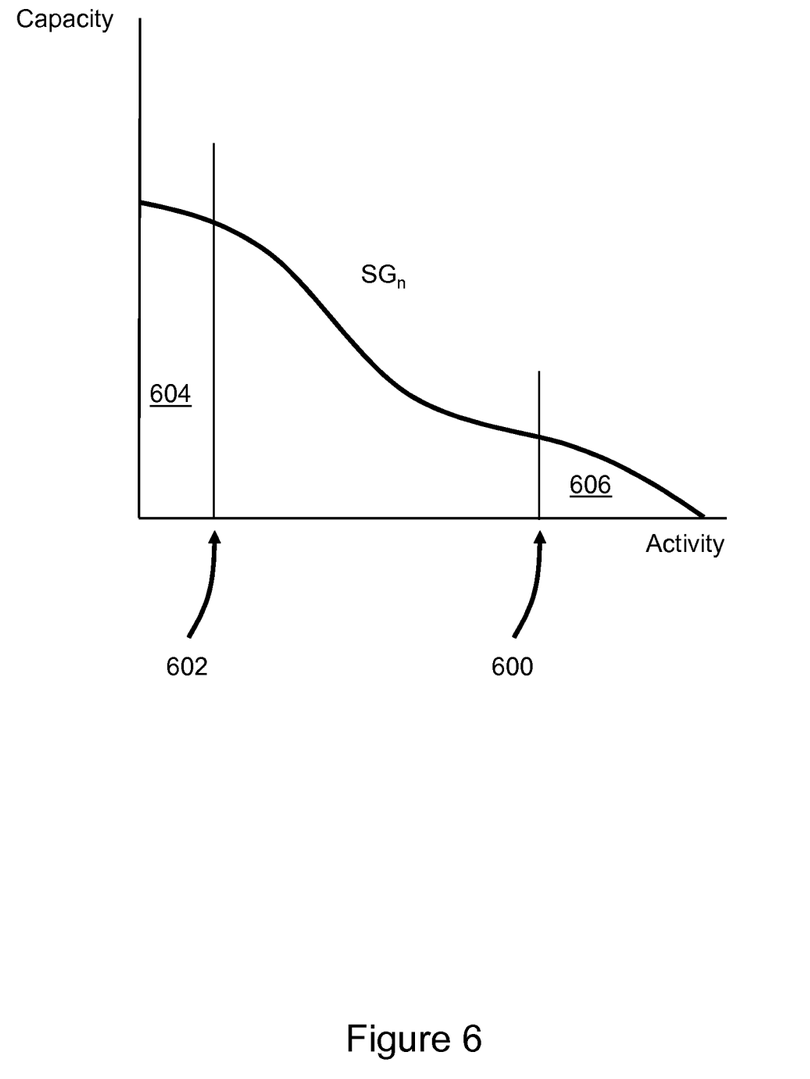
FIG. 6 illustrates a capacity-activity histogram of a storage group.

FIG. 6 illustrates a histogram of extents associated with an exemplary storage group $SG_n$. The histogram is generated from the moving averages 400, 402 (FIG. 4) and capacity utilization 404 (FIG. 4) from the analysis stage. The histogram represents the capacity used by extents versus activity level in IOPS. An upper threshold 600 and a lower threshold 602 qualify extents that are candidates for promotion and demotion, respectively. The short-term average could be used to identify the candidates for promotion while the long-term average could be used to identify the candidates for demotion. In order to move the storage pools into the healthy state defined by the first quadrant in accordance with the technique described above, the least active among candidates 604 are demoted and the most active among candidates 606 are promoted. The number of candidates selected for promotion and demotion is based on the vector required to move the storage pool from a degraded state into the healthy state defined by the first quadrant.

Figure 7:
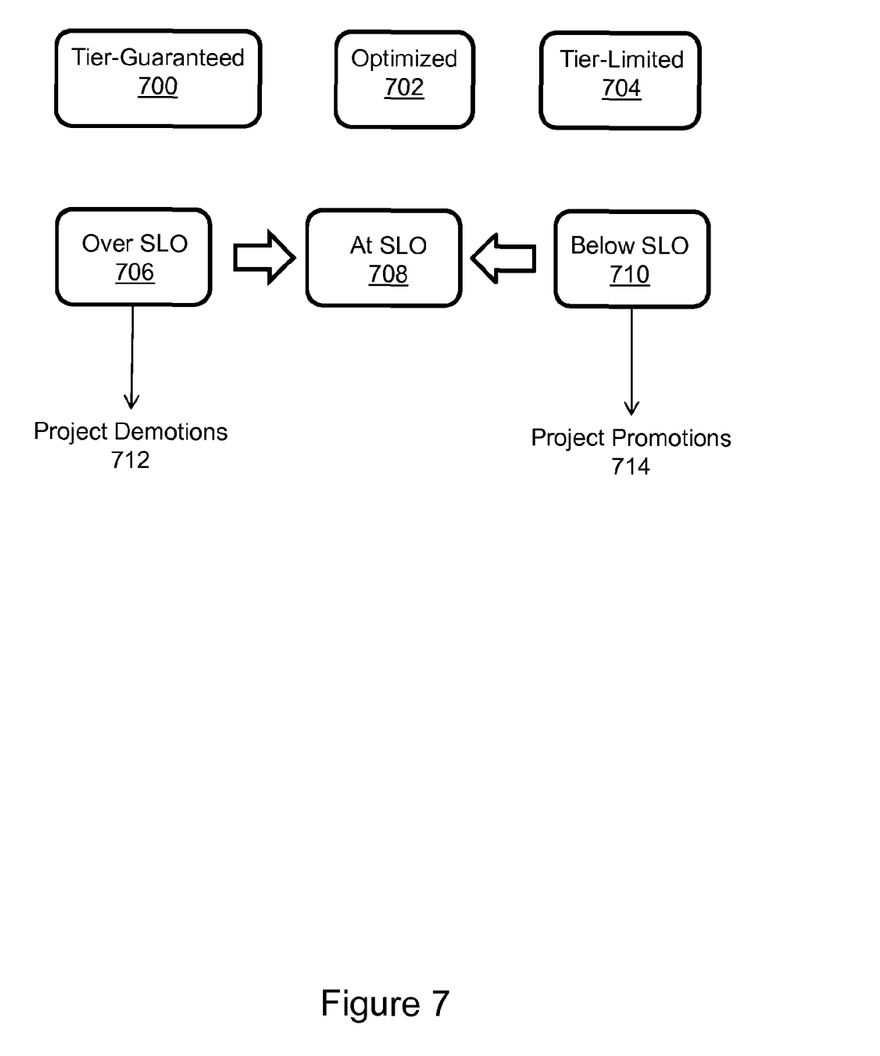
FIG. 7 illustrates consideration of compliance with SLOs (Service Level Objectives).

Referring now to FIGS. 2 and 7, the next operation 220 is to consider SLO compliance. Each SG is classified into one of multiple classes: tier-guaranteed 700, Optimized 702, tier-limited 704, Over SLO 706, At SLO 708, and Below SLO 710. The tier-guaranteed class could include SGs with a subscribed level of service that requires use of tier 0 resources. The Optimized class could include SGs with best efforts type SLOs, e.g., no guarantees. The tier-limited class could include SGs with a subscribed level of service that prohibits use of tier 0 resources. The Over SLO class could include SGs with actual performance that exceeds a subscribed SLO performance level, i.e., greater than 100% SLO satisfaction. The At SLO class could include SGs with actual performance that satisfies a subscribed SLO performance level. The Below SLO class includes SGs with actual performance that fails to satisfy a subscribed SLO performance level, i.e., under 100% SLO satisfaction. Extents associated with tier-guaranteed SGs are not available for demotion from the guaranteed tier. Extents associated with tier-limited SGs are not available for promotion above the tier limit. The most active extents (see histogram of FIG. 6) associated with Below SLO SGs are candidates for promotion. The least active extents (see histogram of FIG. 6) associated with Over SLO SGs are candidates for demotion. The goal is to have all SGs which are not tier-limited, tier-guaranteed or optimized in the At SLO class 708. In other words, the Over SLO SGs and the Below SLO SGs converge on the At SLO class based on promotions and demotions. The data movement engine projects (models) the demotions 712 and projects the promotions 714 based on SLO compliance to track convergence and determine the effect on storage pool state. In general, maintaining first quadrant storage pool state is a higher priority than SLO compliance. If necessary the projections can be adjusted in order to maintain first quadrant storage pool state. The storage engine then prompts movement of data between tiers in accordance with the demotions and promotions of extents projected in accordance with consideration of both storage pool state and SLO compliance.

The operations described above are iterated such that storage tiering decisions track changes in data access activity. The use of local event records based on hash tables helps to enable the storage array to create a database of historical event activity without updating the database at the IO event rate. Use of moving averages for activity forecasts may help to reduce tier-hopping promotions and demotions which can result in degraded performance and thrashing. Promotion and demotion based on state tends to prompt fewer promotions and demotions than known systems which prompt marginal performance improvements as indicated by activity levels. In other words, excessive or unnecessary promotions and demotions may be mitigated. Reducing the number of promotions and demotions may help to keep the movement of data current relative to the activity forecasts. Promotion and demotion based on SLO compliance helps to achieve SLO compliance.

Some aspects, features and implementations may comprise computer components and computer-implemented steps or processes that will be apparent to those skilled in the art. For example, it should be understood by one of skill in the art that the computer-implemented steps or processes may be stored as computer-executable instructions on a non-transitory computer-readable medium. Furthermore, it should be understood by one of skill in the art that the computer-executable instructions may be executed on a variety of physical processor devices. For ease of exposition, not every step or element is described herein as part of a computer system, but those skilled in the art will recognize steps and elements that may have a corresponding computer system or software component. Such computer system and software components are therefore enabled by describing their corresponding steps or elements, and are within the scope of the disclosure.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
a data storage system comprising:
a plurality of non-transitory data storage devices each having a performance capability, where ones of the storage devices having a common performance capability are grouped together in a storage pool at a storage tier and the data storage system includes multiple storage tiers;
at least one storage director which presents logical storage devices to an application, the logical storage devices being backed by the non-transitory storage devices; and
a data movement engine configured, for each storage pool, to:
assign one state of a plurality of states to the storage pool based on demanded activity and demanded capacity, the plurality of states including a healthy state in which demanded activity and demanded capacity are acceptable for the storage pool, a first degraded state in which demanded activity is unacceptable for the storage pool, and a second degraded state in which demanded capacity is unacceptable for the storage pool;

where the storage pool is in the first degraded state, promote extents from that storage pool to a different storage pool of a tier with greater performance capability in order to cause that storage pool in the first degraded state to be in the healthy state; and where the storage pool is in the second degraded state, demote extents from that storage pool to a storage pool of a tier with lesser performance capability in order to cause that storage pool in the second degraded state to be in the healthy state.

2. The apparatus of claim 1 wherein ones of the logical storage devices are grouped together in a storage group, each storage group being associated with a service level objective, and the data storage system including multiple storage groups, and wherein the data movement engine is further configured to classify each of the storage groups as performing at their respective service level objective, below their respective service level objective or above their respective service level objective.

3. The apparatus of claim 2 wherein the data movement engine is further configured to promote extents from storage groups classified as performing below their respective service level objective.

4. The apparatus of claim 2 wherein the data movement engine is further configured to demote extents from storage groups classified as performing above their respective service level objective.

5. The apparatus of claim 1 comprising a plurality of storage directors, each having a local event record of events identified by that storage director.

6. The apparatus of claim 5 wherein each local event record comprises at least one hash table with at least one event counter associated with each active extent.

7. The apparatus of claim 6 further comprising a global event record in which the counters of the local event records are summed for each active extent.

8. The apparatus of claim 7 further comprising a database of historical activity of extents, the database being updated based on the global event record.

9. The apparatus of claim 8 wherein the data movement engine calculates at least one moving average of historical activity for each extent based on the database.

10. The apparatus of claim 9 wherein the at least one moving average is used to determine the demanded activity.

11. A method comprising:
in a data storage system comprising a plurality of non-transitory data storage devices each having a performance capability, where ones of the storage devices having a common performance capability are grouped together in a storage pool at a storage tier and the data storage system includes multiple storage tiers, and at least one storage director which presents logical storage devices to an application, the logical storage devices being backed by the non-transitory storage devices:
for each storage pool:
assigning one state of a plurality of states to the storage pool based on demanded activity and demanded capacity, the plurality of states including a healthy state in which demanded activity and demanded capacity are acceptable for the storage pool, a first degraded state in which demanded activity is unacceptable for the storage pool, and a second degraded state in which demanded capacity is unacceptable for the storage pool;

where the storage pool is in the first degraded state, promoting extents from that storage pool to a different storage pool of a tier with greater performance capability in order to cause that storage pool in the first degraded state to be in the healthy state; and where the storage pool is in the second degraded state, demoting extents from that storage pool to a storage pool of a tier with lesser performance capability in order to cause that storage pool in the second degraded state to be in the healthy state.

12. The method of claim 11 wherein ones of the logical storage devices are grouped together in a storage group, each storage group being associated with a service level objective, and the data storage system including multiple storage groups, further comprising classifying each of the storage groups as performing at their respective service level objective, below their respective service level objective or above their respective service level objective.

13. The method of claim 12 further comprising promoting extents from storage groups classified as performing below their respective service level objective.

14. The method of claim 12 further comprising demoting extents from storage groups classified as performing above their respective service level objective.

15. The method of claim 11 further comprising maintaining a local event record associated with each storage director, each local event record comprising a record of events identified by that storage director.

16. The method of claim 15 further comprising maintaining each local event record as at least one hash table with at least one event counter associated with each active extent.

17. The method of claim 16 further comprising maintaining a global event record in which the counters of the local event records are summed for each active extent.

18. The method of claim 17 further comprising maintaining a database of historical activity of extents, the database being updated based on the global event record.

19. The method of claim 18 further comprising calculating at least one moving average of historical activity for each extent based on the database.

20. The method of claim 19 further comprising determining the demanded activity based on the at least one moving average.

* * * * *